July 14, 1970   R. G. SMETHERS, JR   3,520,502
CARGO LAUNCHING AND RECOVERY APPARATUS FOR AIRCRAFT
Filed Nov. 12, 1968                              4 Sheets-Sheet 2

INVENTOR.
ROLLO G. SMETHERS, JR.
BY George C Sullivan
       Agent
John J. Sullivan
       Attorney July 14, 1970     R. G. SMETHERS, JR     3,520,502

CARGO LAUNCHING AND RECOVERY APPARATUS FOR AIRCRAFT

Filed Nov. 12, 1968     4 Sheets-Sheet 3

*INVENTOR.*
ROLLO G. SMETHERS, JR.
BY *George C Sullivan*
    Agent
*John J. Sullivan*
    Attorney

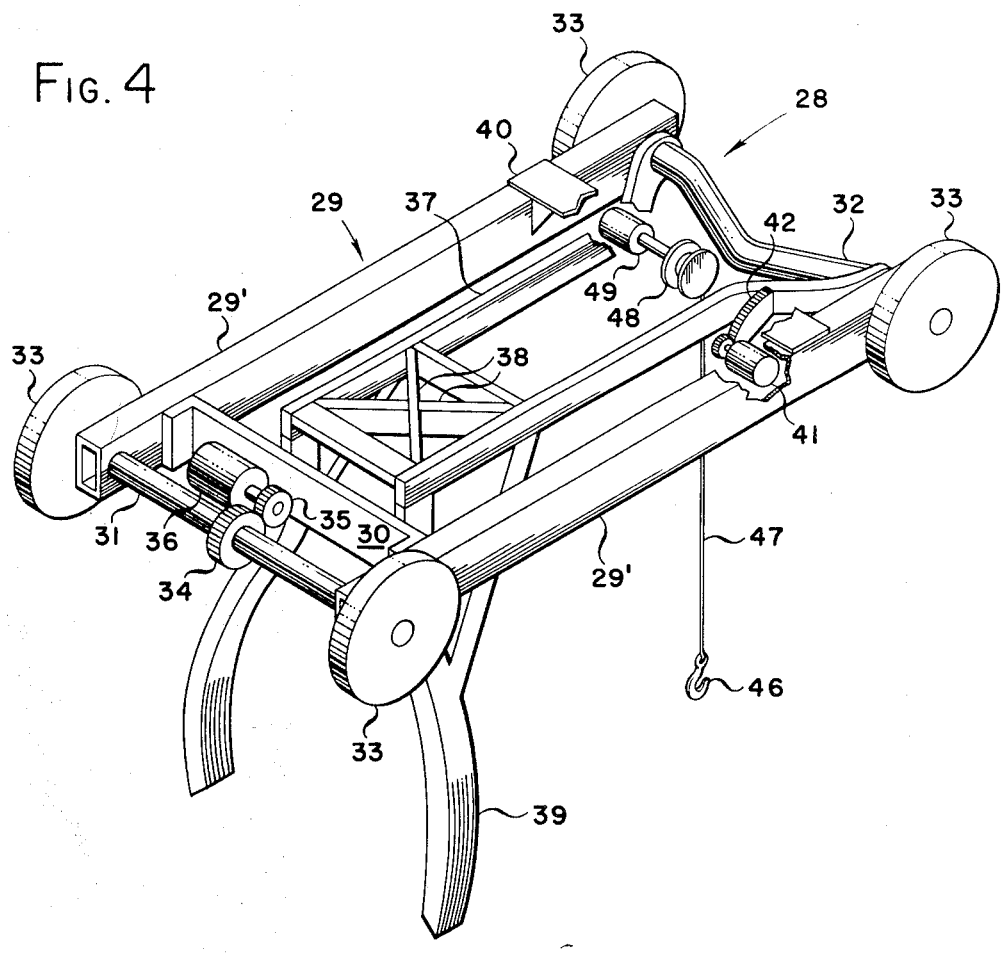
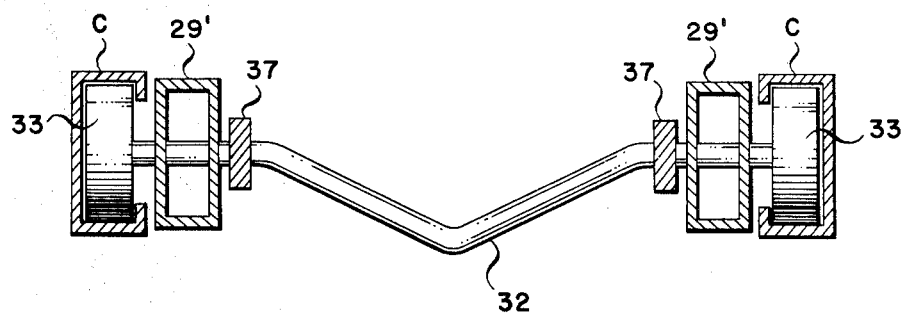

United States Patent Office 3,520,502
Patented July 14, 1970

3,520,502
CARGO LAUNCHING AND RECOVERY
APPARATUS FOR AIRCRAFT
Rollo G. Smethers, Jr., Atlanta, Ga., assignor to Lockheed Aircraft Corporation, Burbank, Calif.
Filed Nov. 12, 1968, Ser. No. 774,651
Int. Cl. B61b 5/02; B64d 1/10
U.S. Cl. 244—137                                        10 Claims

ABSTRACT OF THE DISCLOSURE

Utilizing an aerial delivery type aircraft with aft doors, parasite aircraft (manned or drone) are flown to and from the parent aircraft in flight. The small aircraft is taken on and off the carrier aircraft by means of a power driven carriage riding on an overhead track in the parent aircraft. The aftmost part of this track extends to the end of the parent aircraft and is pivotable so that when the aft doors are open it can be swung through the doorway and into the airstream below the parent aircraft. The carriage is provided with connecting and hoist means to releasably engage one parasite aircraft at a time and deliver it to and from remote stations, one a parking station within the parent aircraft and the other a launching and retrieving station at the aft extremity of the overhead track.

---

This invention relates to integral cargo launching and retrieval systems for aircraft designed for operation during flight thereof, and more particularly to such a system that is especially designed to launch smaller or parasite aircraft, such as fighter, interceptor, reconnaissance, etc., aircraft and drones from larger or parent aircraft and subsequently recover them.

The present invention contemplates improvements in the techniques of aerial delivery or launching and retrieval of cargo, especially smaller parasite aircraft or drones from a larger mother ship whereby increased flexibility and capability in the aircraft mission performance may be realized. This is largely accomplished by optimizing the design of the apparatus internally of the aircraft, i.e., within the storage compartment or hold of the aircraft, to provide manipulation of the smaller aircraft housed therein from its stored location or station to and from its ejection and recovery station. This apparatus allows the maximum utility of the hold area so that the greatest number of aircraft can be contained therein and manipulated during the ejection and retrieval operation in a most expeditious, reliable and repetitious manner.

As an integral part of this apparatus, extensible and retractable connectors are provided to secure in a positive manner and to release the parasite aircraft in proper relative position with respect to the mother aircraft to assure proper separation and connection and especially reconnection during the retrieval operation.

This apparatus is especially designed and adapted to be compatible with and installed for operation on transport or cargo type of aircraft with aft on and off loading doors. The advantages of aerial launch and retrieval from the rear extremity of the aircraft reside primarily in the smoother air flow about the smaller aircraft during the operation as compared with the more conventional mid-airplane bombay doors which inherently, due to the in and out air flow, produce turbulence. The normal midship interruption due to the location of the bombay doors is avoided as well and a relatively free flow of the parasite aircraft from the parked to the launching and recovery position is possible.

At the same time, the aft location disposes the parasite aircraft remote with respect to the external engines and which also have the effect of interfering with a smooth air flow. Additionally, this location minimized the suction normally attending the release of the parasite aircraft and facilitates its separation avoiding the possibility of tumbling or otherwise contacting the mother aircraft.

The broad concept of using "sky hook" airplanes is old, dating back almost to the beginning of the aviation age. Much work has been devoted to and considerable success has been had in making the in-flight connection and disconnection. Thus, the techniques of "hook on" have become a routine maneuver for trained personnel. The instant invention, therefore, addresses itself to the real problems that are involved, viz., means facilitating the moving of the parasite aircraft to and from their location internally of the carrier aircraft outwardly to a point where they are separated and reconnected in a safe and reliable manner. The primary purpose of the invention may be said to be related to improvements in this phase of the operation whereby the concept can be put into greater practice and use.

More specifically the apparatus herein contemplated consists of an overhead guide and track assembly located within the hold of the mother aircraft adapted to receive a mount or carriage which releasably engages a parasite aircraft and by which the parasite aircraft is conveyed from a parked location internally of the hold to a delivery station substantially aft of the hold and outwardly into the airstream. For this purpose, this carriage is specifically mounted for hinged movement with a section of the track and guide assembly to swing when located in its extreme aft position outwardly with respect to the mother aircraft so as to be displaced therefrom. As an added feature, the carriage in moving along the track is facilitated by special power, and intermediate stabilizing structure acts between the carriage and parasite aircraft to maintain it in the desired, relatively stationary position at all times during its connection with the carriage, i.e., prior to separation and subsequent to reconnection.

With the above and other objects in view, as will be apparent, this invention consists in the construction, arrangement, and combination of parts, all as hereinafter more fully described, claimed, and illustrated in the accompanying drawings, wherein:

FIG. 1 is a side view of a substantial part of an aircraft typical of the cargo or transport class considered by this invention, partly in section to show the general arrangement of the launching and recovery apparatus contemplated herein, several auxiliary aircraft being shown within the hold of the cargo or parent aircraft located at their stored stations and one of such auxiliary aircraft being shown in phantom lines in a sequence of positions from its stored station within the parent aircraft to its launching and retrieval station externally of the parent aircraft by means of and through the instant apparatus;

FIG. 4 is an isometric view of the carriage assembly of the instant apparatus adapted to roll along the track assembly in delivering each auxiliary aircraft to and from the stored and launching/retrieval stations;

FIG. 5 is a transverse section taken through one of the parallel rows of the track assembly with the associated portion of the carriage assembly to show the coaction thereof to permit movement of the latter on the former;

FIG. 8 is a detail of the connector element carried by each auxiliary aircraft to show the lock thereof to positively engage complemental means carried by the carriage as well as the release therefor.

Figure 1:
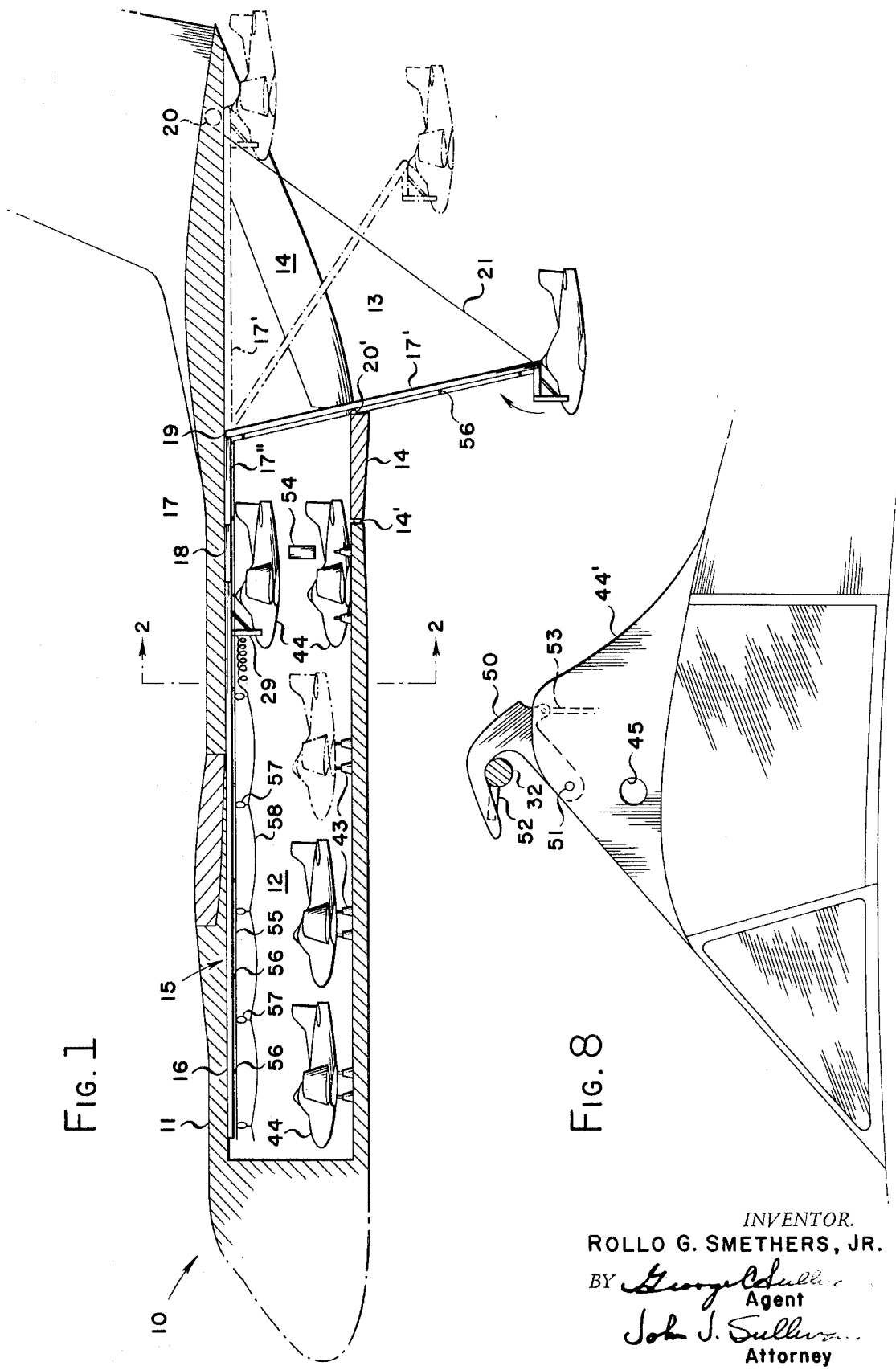
Figure 2:
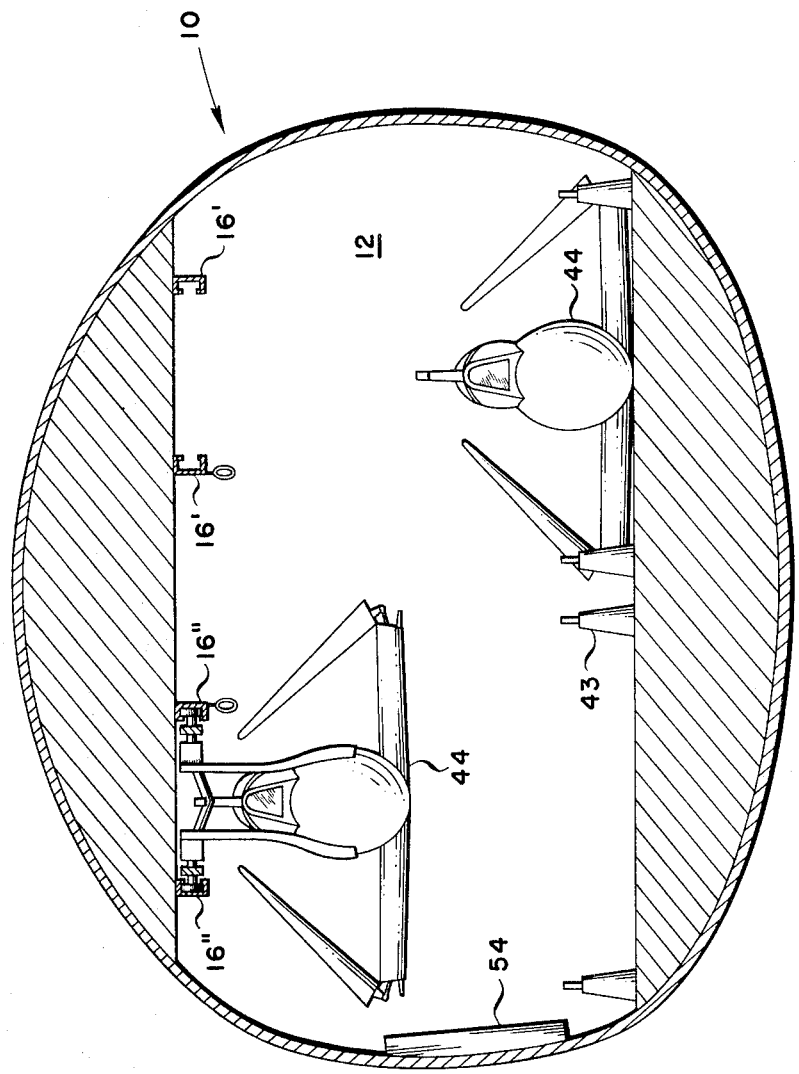
FIG. 2 is a transverse section taken along line 2—2 of FIG. 1 to show parallel rows of stored, auxiliary aircraft within the hold of the parent aircraft and the associated portions of the instant apparatus, the main wings of the auxiliary aircraft being folded to minimize the transverse dimension required to accommodate them within the hold of the parent aircraft.

Referring more particularly to the drawings, 10 designates a cargo or transport class aircraft the principal portion of the fuselage 11 of which is taken up by a storage compartment or hold 12. The fuselage 11 terminates at its aft end in an opening 13 for on and off loading. Typically, such opening 13 is closed by a two-piece door 14 disposed in coextensive alignment so as to form a smooth and aerodynamic continuation of the fuselage surface when closed with adjacent edges in abutment and secured. In the open position the aft section of the door 14 is virtually removed in any convenient manner by appropriate means to permit complete access to the interior of the hold 12. The forward door section may be hinged as at 14' for example to the adjacent fuselage 11 and moved to a position where the inner surface thereof forms a continuation of the hold floor to constitute an extension thereof. As such this extension facilitates on and off loading of cargo and also aerial delivery operations.

The launch and recovery apparatus herein proposed is designed for installation within the airplane hold 12 so as to form an integral part thereof. At the same time when thus installed it occupies an out-of-the-way position so as to render the hold area free and virtually unobstructed for other operations or missions of the aircraft 10 being located in an otherwise unused area of the hold 12. This apparatus includes a track assembly 15 which is substantially coextensive in length with the hold 12 and terminates at substantially the aft extremity of the fuselage 11. It is formed in three main sections, the forwardmost 16 comprising a pair of dual parallel tracks 16' and 16", an aft terminal track 17 common to both pair of the dual tracks 16' and 16" with an interconnecting switch assembly 18 to operatively connect either pair of the dual tracks 16' or 16" to the terminal track 17.

The aft end portion 17' of the terminal track 17 is pivotally connected as at 19 to the stationary forward portion 17" and a power mechanism, such as for example a winch 20 and cable 21, connects the free aft extremity of the terminal track 17 to associated fuselage structure. Thus the aft track section 17' is raised and lowered to and from positions in alignment with the forward track section 17" and laterally thereof to project through the opening 13 externally of the aircraft 10. The length of this pivoted track section 17' is predetermined to establish the exact displacement of the free end from the aircraft 10 when in the fully extended position. At this time, the front door section 14 is open and the rotary movement of the track section 17' about the pivot 19 is stopped by its abutment against the end of this door section 14. For this reason a snubber 20' of appropriate energy absorbing material or the equivalent is provided on section 17'.

Figure 3:
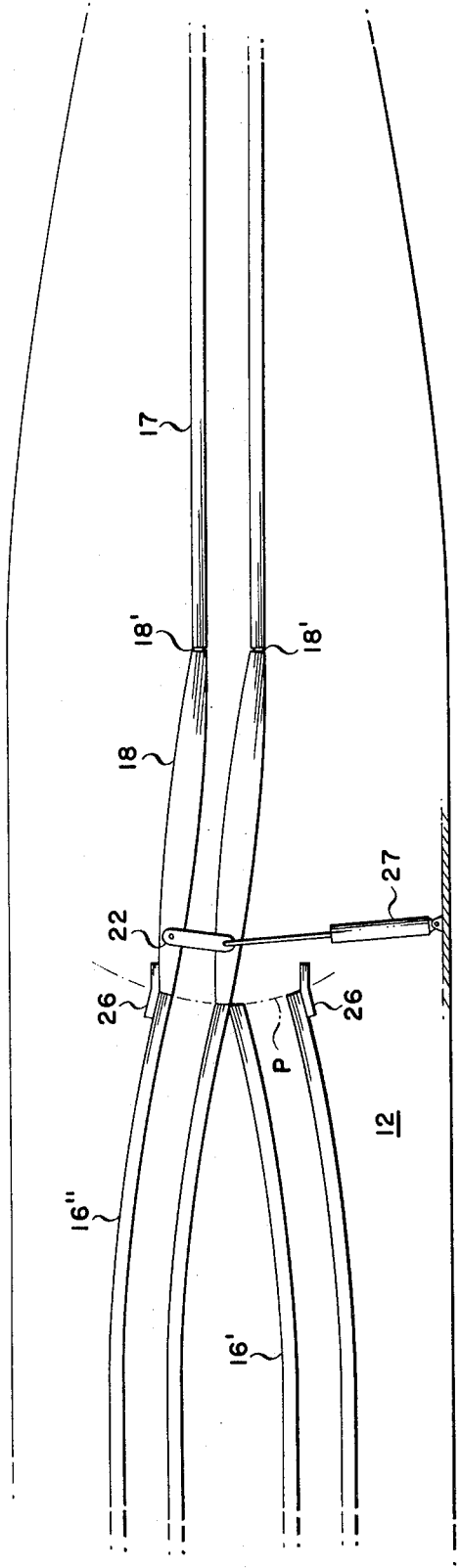
FIG. 3 is a plan view of the parent aircraft in the area and from overhead of the hold to show the track assembly of the instant apparatus whereby the parallel rows of stored, auxiliary aircraft are channeled into a common terminal track for delivery to and from the launch and retrieval station.
Figure 7:
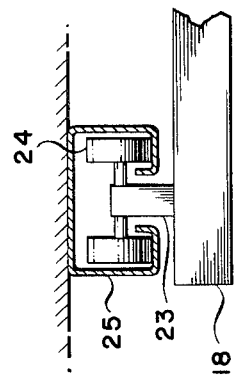
FIG. 7 is a detail of the forward end of the switch assembly to show its mounting to the ceiling of the hold for controlled lateral movement for coaction with either pair of parallel tracks.
Figure 6:
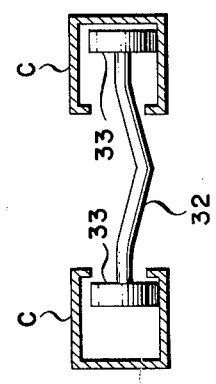
FIG. 6 is a similar section taken through the junction or switch assembly that interconnects the parallel rows of tracks with the common terminal track to show primarily the transverse configuration thereof to assure proper alignment of each pair of parallel tracks and the common terminal track.

Each of the several track elements which comprise the dual tracks 16' and 16", switch assembly 18 and terminal track 17 is formed by a channel C (FIG. 5) with each pair of coacting channels opening toward each other. The channels C forming the switch assembly 18 are each pivotally connected at their aft end as shown at 18' in FIG. 3 to the corresponding channels C of the terminal track 17 and are interconnected one to the other adjacent their forward ends by a fixed length spacing member 22 so as to maintain them the desired distance apart.

At their forward ends the channels C of the switch assembly 18 also each terminates in an upright extension 23 mounting a roller assembly 24 which is adapted to operate in an arcuate, channeled track 25 secured to adjacent fuselage structure. The track 25 defines a controlled path P of movement for the assembly 18 in going from one to the other pair of dual tracks 16' and 16". Appropriate stops 26 are associated with each pair of the dual tracks 16' and 16" to arrest the switch assembly 18 when its track elements or channels C are properly aligned with those of the selected track 16' and 16". Actuating means is provided, preferably in the form of a hydraulic cylinder 27, secured at one end to stationary fuselage structure and at its other end to the switch assembly 18 adjacent the outer, swinging end thereof to move it to and from the extreme positions.

A carriage assembly 28 as most clearly shown in FIG. 4 is adapted to operate in the track arrangement as above described. This carriage assembly 28 is constructed of a generally rectangular frame 29 defined by parallelly disposed longitudinal box beams 29' interconnected by at least one cross brace 30 adjacent its forward end. A front and rear axle 31 and 32 respectively is mounted across each end of the frame 29, each extending at its opposite ends beyond the associated beams 29' where it mounts a wheel 33. These wheels 33 on corresponding sides of the carriage 29 are adapted to be located within the complemental channels C of the tracks 16' and 16", switch assembly 18 and terminal track 17 whereby the carriage 29 may move freely along the track assembly 15 covering virtually the entire area of the hold 12.

The front axle 31 is keyed or otherwise secured to its wheels 33 and carries a drive gear 34 in constant mesh with a pinion gear 35 operatively connected to the shaft of an appropriate electric motor 36. Operation of the motor 36 thereby serves to rotate the axle 31 and connected wheels 33 in either direction so as to power the carriage 28 in its movement as described.

The rear axle 32 is V-shaped and rotatably mounted in any known manner to the beams 29' with the wheel 33 at each end thereof freely rotatable thereon. A saddle support frame 37 is rotatably mounted on the rear axle 32 so as to be generally contained within the frame 29 of the carriage 28. This saddle support 37 is generally rectangular and interconnected by cross braces 38 adjacent the forward end thereof to maintain its structural integrity with an attached saddle 39 depending from the forwardmost extremity thereof. This saddle 39 may, if desired, be padded for reasons to become more apparent. The movement of the saddle support 37 with respect to the carriage frame 29 is restricted by a cross brace 40 on the upper side of the carriage 28; and appropriate drive means, preferably a two-way electric motor 41 carried by the frame 29 is employed for coaction by and through its drive gear or pinion with a rack 42 on the saddle frame 37 to move it through the desired arc.

A carriage assembly 28 is mounted in the above described manner within each pair of tracks 16' and 16", although a single carriage assembly 28 could be operated over both pairs of track 16' and 16". Thus each carriage 28 is adapted for linear movement with respect to the aircraft throughout substantially the entire longitudinal dimension of the fuselage hold 12 due to the coaction of the complementary channel elements C of the switch assembly 18 and terminal track 17. By means of the dual track arrangement a carriage assembly 28 can be made to cover virtually any part of the hold floor area. Such hold floor area is provided with appropriate mounts to connect a plurality of tie-down fittings or parking supports 43, each set or group being designed and adapted to support an auxiliary aircraft or drone 44. Thus, the several drones 44 are arranged in a pair of parallel rows establishing their stored station within the aircraft during flight and prior to being activated or put into operation. Using known technique the wings of the several stored drones 44 may be folded.

Each drone 44 is provided with attachment means in the form of a fitting 44' with a connecting eye 45 adapted to receive a hook 46 carried at the end of a pick-up cable 47 from the carriage assembly 28. To this end, the carriage assembly 28 mounts a winch 48 with an associated drive, preferably a reversible electric motor 49. The end of the cable 47 is connected to the winch 48 which when rotated by operation of the motor 49 pays out and reels in the cable 47 locating the hook 46 accordingly with respect to the carriage 28.

With the carriage assembly 28 operating in the track assembly 15 as above described, it is positionable above each one of the drones 44 and the hook 46 may be connected to the eye 45 of the selected drone 44. Thereafter, operation of the winch 48 serves to raise the connected drone 44 to the ceiling of the hold 12. Thus located, the carriage 28 may be driven aft to the extremity of the terminal track 17 by operation of the drive motor 36 and rotation of the forward wheels 33.

It is to be noted that the lifting of the connected drone 44 in the described fashion allows for any one of the drones 44 to be moved from its stored or parked position and drone removal commencing with the most rearward one is unnecessary. If necessary, any one or more of the parked drones 44 may be lowered by removal of its supports 34 as indicated in FIG. 1 where the aftmost drone 44 within the hold 12 is illustrated "down" to allow the next drone 44 to "leap-frog" it in moving to the launch and recovery station. This precludes any delay or mission abortion due to a breakdown of a particular drone 44 which happens to be located aft and blocks the removal of other operable drones 44 to the launch and recovery position.

As each drone 44 is thus moved from its stored or parked position and located at the aft extremity of the terminal track 17, the winch 20 is operated to release its brake and allow the hinged terminal track section 17' to drop under the controlled pay out of the cable 21. The terminal track section 17' eventually reaches its extreme, protracted position at which time the snubber 20' carried by the hinged track section 17' contacts the aft door 14. During this movement, the saddle drive 41 is operated to rotate the saddle frame 37 maintaining the saddle 39 in contact with the fuselage of the drone 44 to assure its stability. Upon reaching the fully extended position, and when the drone 44 is to be separated the operation of the saddle drive motor 41 may be reversed and the saddle 39 withdrawn by being rotated to a position inwardly of the carriage 28.

The fitting 44' on each aircraft 44 carrying the eye 45 terminates in an engagement suitable for coaction with the rear axle 32 of the carriage 28 when the parasite aircraft 44 is raised to the top of the hold. This engagement preferably is formed by a hook 50 that projects in a forward direction and is so located with respect to the cg of the parasite aircraft 44 that the mass of the aircraft 44 maintains it supported on the carriage 28. The V-shaped axle 32 serves as a centering device in this position.

Preferably this hook 50 is pivotally mounted on the fitting 44' as at 51 and includes a spring-loaded ratchet pawl 52 to assure retention of the axle 32 therein while offering no restriction to its reception by the hook 50. An actuating rod 53 is provided to move the hook 50 to the released position. Preferably the actuating rod 53 is operated by a hydraulic cylinder or the equivalent (not shown) conveniently mounted within the parasite aircraft 44.

In order to control the several electrical power devices, such as the several motors 36, 41 and 49 carried by the carriage 28 and possibly the engine ignition and the actuator or release 53 of each aircraft 44 in the case of a drone, a remotely-controlled operating system is envisaged. Thus, a common control panel 54 is provided preferably near the aft fuselage opening 13 where the several leads from these electrical devices are brought and operatively connected to conventional switches, etc., for the convenience of the loadmaster or other operator.

To facilitate this and particularly to properly handle the several conductors involved, a trolley cable 55 is mounted as indicated generally at 56 coextensively with the track assembly 15. This cable 55 is drawn taut and accommodates a number of rings 57 each of which is attached to a sleeve or casing 58 in which the several conductors or wire leads associated with the carriage 28 are bundled and pass. Preferably the casing 58 is of the recoiling type to prevent undue slack therein when the carriage 28 is in the forwardmost location of the hold 12. This in conjunction with relatively close spacing of the several rings 57 maintains the casing 58 in close proximity to the ceiling of the hold 12 at all times.

While the foregoing describes and illustrates what is deemed to be a preferred embodiment of the invention, it is not all inclusive. Various modifications of this preferred structure are recognized and the appended claims are intended to cover these as well.

What is claimed is:

1. A cargo launching and recovery apparatus for aircraft having an internal storage compartment with an on and off loading opening at its aft end comprising:
   an overhead track assembly mounted within the aircraft and substantially coextensive with said storage compartment, said track terminating in a hinged section of greater length than the height of the fuselage adapted to swing to and from extreme positions where it forms an in-line extension of the forward track section and is disposed angularly thereto extending outwardly through said compartment opening with its free end spaced from and below said aircraft;
   a power driven carriage mounted for movement on said track assembly;
   an engagement operative to secure and release said cargo to said carriage; and
   an actuator for said engagement whereby said cargo may be connected to and disconnected from said carriage when located in the extreme positions aforesaid.

2. The apparatus of claim 1 wherein said track assembly includes multiple parallelly disposed track elements all terminating in a single common terminal track forwardly of the hinged section aforesaid.

3. The apparatus of claim 2 including a switch element interposed between said parallel track elements and said terminal track operable to selectively connect any one of said parallel track elements to said terminal track.

4. The apparatus of claim 3 wherein said switch element, said parallel track elements, and said terminal track are all formed by C channels arranged in coextensively disposed pairs opening toward each other, and said carriage includes wheels rollable in said channels.

5. The apparatus of claim 1 wherein said engagement includes a pivotal attachment and said carriage includes an extensible and retractable stabilizing element to engage said cargo at all times and in all angular positions when secured to the carriage as aforesaid.

6. The apparatus of claim 5 wherein said carriage is formed by a generally rectangular frame and said pivotal attachment includes a generally V-shaped cross member rotatably mounted in a symmetrical position on said frame.

7. The apparatus of claim 1 wherein said carriage includes a power operated hoist operable to move said cargo vertically with respect thereto.

8. The apparatus of claim 1 including a winch and cable mounted on said aircraft adjacent the aft end thereof with the free end of said cable connected to said hinged track section to control the movement thereof to and from said extreme positions.

9. The apparatus of claim 5 wherein said cargo is a parasite aircraft and said stabilizing element includes a saddle shaped to conform to the fuselage of said parasite aircraft.

10. The apparatus of claim 8 including a snubber fabricated of energy absorbing material carried by said hinged track section and adapted to contact said aircraft when said section is located in its extreme angular position aforesaid.

References Cited

UNITED STATES PATENTS

| | | | |
|---|---|---|---|
| 809,618 | 1/1906 | Keech | 104—164 |
| 836,042 | 11/1906 | Johnston | 104—103 |
| 1,869,506 | 8/1932 | Richardson | 244—2 |
| 2,358,487 | 9/1944 | Anjeskey | 104—94 |
| 3,051,419 | 8/1962 | Weiland et al. | 244—137 |

MILTON BUCHLER, Primary Examiner

J. E. PITTENGER, Assistant Examiner

U.S. Cl. X.R.

104—103, 164